US008941819B2

(12) United States Patent
Anisimov

(10) Patent No.: US 8,941,819 B2
(45) Date of Patent: Jan. 27, 2015

(54) LASER SPEED GUN OPTICAL SYSTEM

(75) Inventor: Sergei Anisimov, Modiin (IL)

(73) Assignee: Stins Coman Inc., Moscow (RU)

( * ) Notice: Subject to any disclaimer, the term of this patent is extended or adjusted under 35 U.S.C. 154(b) by 0 days.

(21) Appl. No.: 13/697,336

(22) PCT Filed: Aug. 29, 2011

(86) PCT No.: PCT/IL2011/000693
§ 371 (c)(1),
(2), (4) Date: Nov. 9, 2012

(87) PCT Pub. No.: WO2012/038951
PCT Pub. Date: Mar. 29, 2012

(65) Prior Publication Data
US 2013/0057847 A1 Mar. 7, 2013

Related U.S. Application Data

(60) Provisional application No. 61/384,331, filed on Sep. 20, 2010.

(51) Int. Cl.
*G01C 3/08* (2006.01)
*G01S 17/58* (2006.01)
*G01S 7/481* (2006.01)
*G01S 17/02* (2006.01)

(52) U.S. Cl.
CPC .............. *G01S 17/58* (2013.01); *G01S 7/481* (2013.01); *G01S 17/023* (2013.01)
USPC .......................................................... 356/28

(58) Field of Classification Search
USPC .......................................................... 356/28
See application file for complete search history.

(56) References Cited

U.S. PATENT DOCUMENTS

| | | | | |
|---|---|---|---|---|
| 4,190,362 | A | * | 2/1980 | Dubrunfaut .................. 356/5.07 |
| 6,101,334 | A | * | 8/2000 | Fantone ........................ 396/72 |
| 6,860,350 | B2 | * | 3/2005 | Beuhler et al. ............... 180/167 |

(Continued)

FOREIGN PATENT DOCUMENTS

| CN | 101299066 A | 11/2008 |
|---|---|---|
| CN | 101349757 A | 1/2009 |

OTHER PUBLICATIONS

International Search Report and Written Opinion for Application No. PCT/IL2011/000693 dated Jan. 13, 2012.

(Continued)

*Primary Examiner* — Luke Ratcliffe
*Assistant Examiner* — Vicente Rodriguez
(74) *Attorney, Agent, or Firm* — Alston & Bird LLP

(57) ABSTRACT

A laser speed gun comprises a laser ray transmitter provided on an optical axis with a laser ray emitting device and with a short distance lens and located at an intermediate location therebetween on said optical axis, a beam splitter allowing laser rays to pass through and reflect visible light toward a CCD camera; a laser ray receiver provided on an optical axis with a laser ray receiving device and with a long distance lens located at an intermediate location between them on said optical axis, a beam splitter allowing laser rays to pass through and reflect visible light from a target toward a CCD camera; and two CCD cameras, one of which is associated with the laser ray transmitter optics and receives reflected light from its beam splitter, and the other which is associated with the laser ray receiver optics and receives reflected light from its beam splitter.

5 Claims, 4 Drawing Sheets

(56) References Cited

U.S. PATENT DOCUMENTS

| | | |
|---|---|---|
| 2004/0118624 A1 | 6/2004 | Beuhler et al. |
| 2004/0159153 A1 | 8/2004 | Dilz, Jr. |
| 2006/0050929 A1 | 3/2006 | Rast et al. |
| 2006/0208193 A1 | 9/2006 | Bodkin |
| 2008/0277567 A1 | 11/2008 | Doran et al. |
| 2009/0267895 A1 | 10/2009 | Bunch |

OTHER PUBLICATIONS

International Preliminary Report on Patentability for Application No. PCT/IL2011/000693 dated Mar. 26, 2013.

* cited by examiner

LASER SPEED GUN OPTICAL SYSTEM

FIELD OF THE INVENTION

The invention relates to the measurement of vehicles' speed. More particularly, the invention relates to an improved laser speed gun.

BACKGROUND OF THE INVENTION

Police detection speed cameras known in the art employ a dedicated laser transmitter/receiver, coupled to a camera located in the same body or casing, which is used to acquire images of the vehicle the speed of which is being measured by the laser assembly. Speed measurement is accurately derived by computing the time difference between laser light emitted by the laser gun, and reflected laser light returning to it from the target vehicle.

In order to provide evidence of the speed at which the vehicle was traveling at the time of measurement, a camera acquires an image of the vehicle (which typically, in modern laser guns is done in digital form), which permits to identify it. In prior art laser guns the camera typically consists of a different module assembled on the laser gun body. FIG. 1 schematically shows three prior art architectures of laser guns of this type. In all cases the image-acquiring element (camera) 1 is mounted on the casing of the laser transmitter/receiver, either above or below it. The camera needs to be aligned to the laser gun transmitter since it is located in a different location on the laser gun body and needs alignment to the laser beam so that the acquired image coincides with the vehicle, the speed of which is being measured. However, because of that structure (as illustrated in FIG. 1) prior art laser guns may become easily misaligned. For instance, if the camera module suffers an impact (e.g., by being dropped, or hit while leaving the car, or thrown on the back seat, etc.) its calibration is altered, which may result in the image of the wrong vehicle being taken or, in other words, the vehicle the speed of which is being measured may not be the same vehicle portrayed in the photograph taken at the time of measurement. This problem has caused many issues in legal proceedings against speeding drivers, making it difficult to convince the courts that the measured speed that was attributed to a given driver was actually that of the car in the photograph.

It is therefore clear that it would be highly desirable to provide a laser speed gun that does not suffer from the aforementioned problems, and which is reliable in both measuring speed and in matching that measurement to the correct vehicle.

SUMMARY OF THE INVENTION

The invention relates to a laser speed gun comprising:
a) a laser ray transmitter provided on an optical axis with a laser ray emitting device and with a short distance lens and, located at an intermediate location between them on said optical axis, a beam splitter suitable to allow laser rays to pass through it and to reflect visible light from a target toward a CCD camera;
b) a laser ray receiver provided on an optical axis with a laser ray receiving device and with a long distance lens and, located at an intermediate location between them on said optical axis, a beam splitter suitable to allow laser rays to pass through it and to reflect visible light from a target toward a CCD camera;
c) two CCD cameras, one of which is associated with the laser ray transmitter optics (Short distance lens) and receives reflected light from its beam splitter, and the other which is associated with the laser ray receiver optics (Long distance lens) and receives reflected light from its beam splitter.

According to the invention, all elements are assembled in a single housing.

In one embodiment of the invention the laser speed gun comprises one Long Distance Lens for taking images located at distances of 50 m to 400 m, and one Short Distance Lens for taking images located at distances of 15 m to 60 m. In one embodiment the focus of the Long Distance lens is about 126 mm, and that of the Short Distance lens focus is about 50 mm, although, of course, the above dimensions are only provided as an example and other dimensions can be employed, depending on available elements and specific device requirements.

In another embodiment of the invention the laser speed gun comprises one Laser Class I Transmitter Diode, one Laser Receiver, two Semi-Transparent Mirrors (Beam Splitter), and two CCD Cameras.

DETAILED DESCRIPTION OF THE INVENTION

According to the invention there is provided a system comprising a transceiver and a receiver unit, wherein on each of the transceiver and of the receiver a CCD camera is provided on the same optical system. The system of invention is much more accurate and reliable in measuring vehicle speed, as compared to prior art devices. An additional advantage of the invention is that the user can monitor the status of his measurement in real time, using a high-resolution swivel LCD screen that continuously shows a real-time picture of the vehicle the speed of which is being measured by the laser gun.

Figure 1:
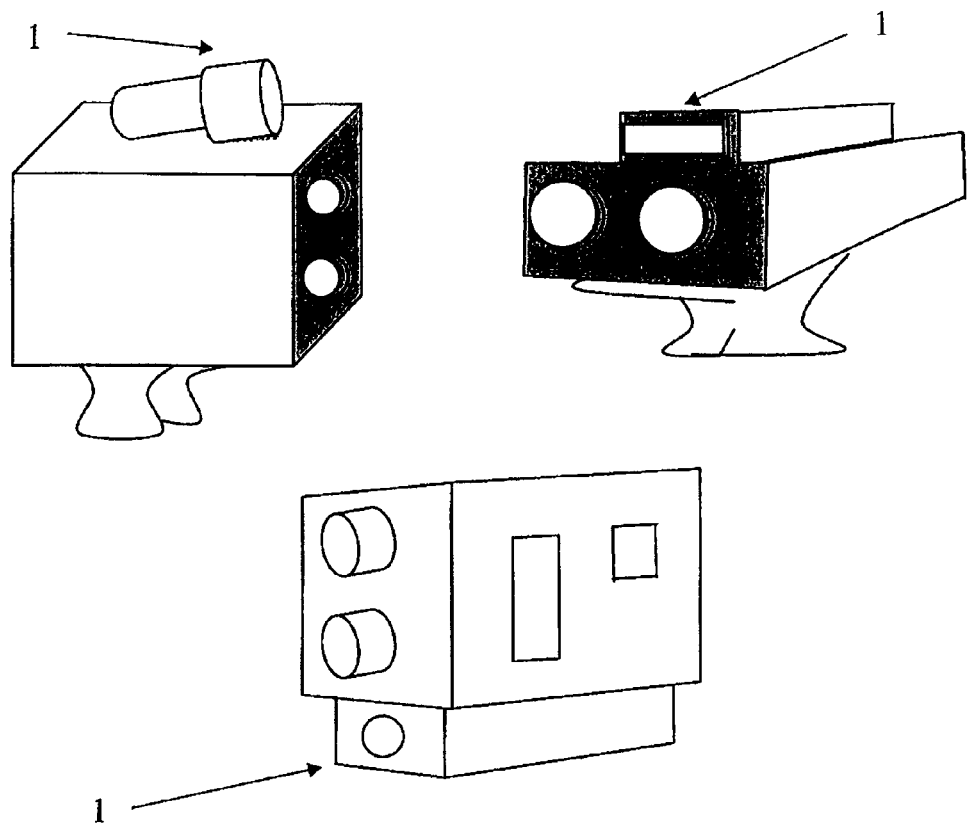
FIG. 1 schematically shows the architecture of three prior art laser speed guns.
Figure 2:
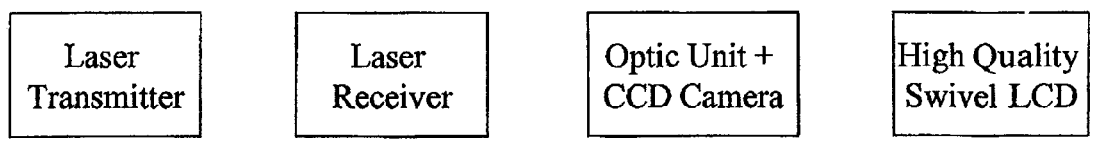
FIG. 2 schematically shows the main components of a laser speed camera according to an embodiment of the invention.
Figure 3:
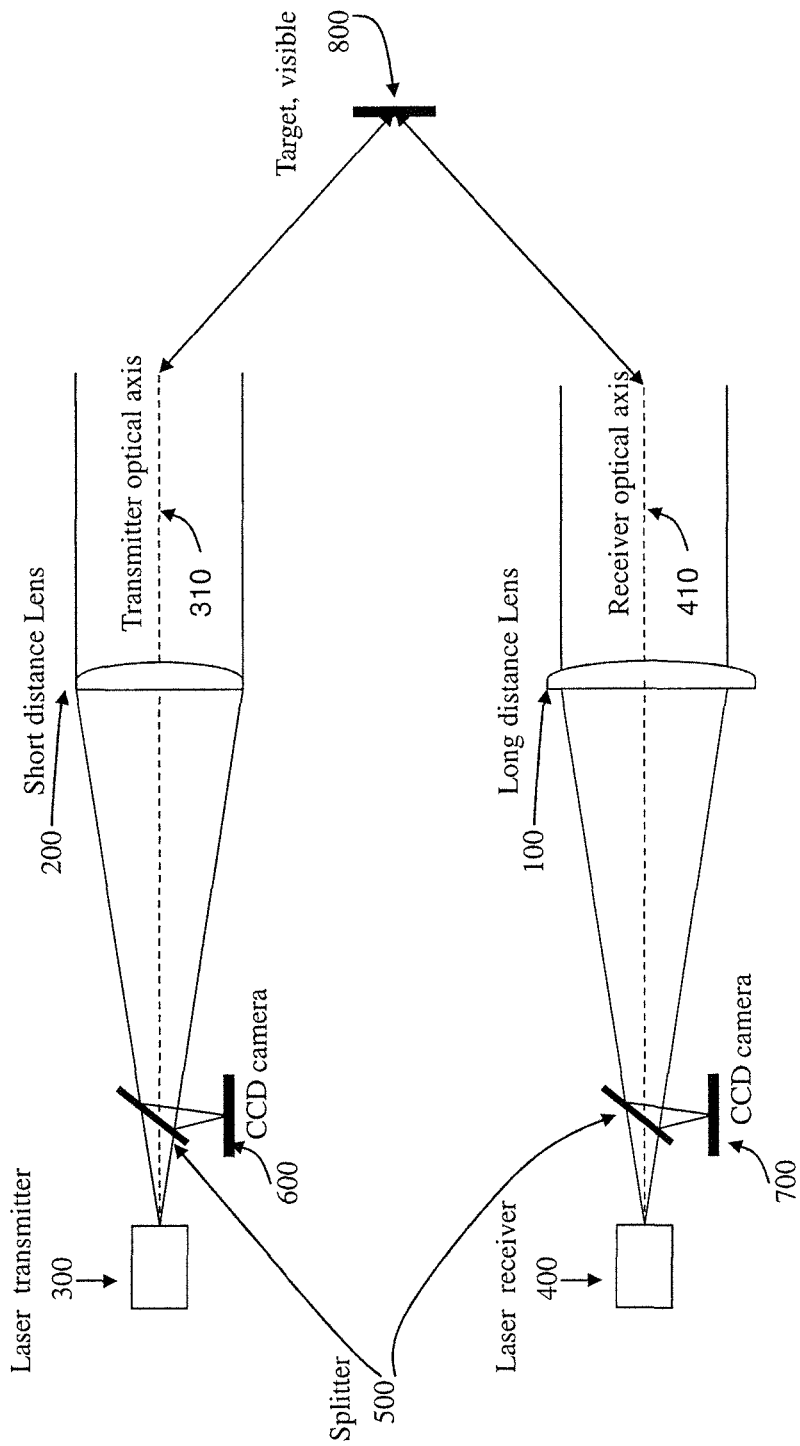
FIG. 3 is a scheme of the optical structure of a laser speed gun according to an embodiment of the invention.

Reference is now made to FIG. 3 that schematically illustrates the optical structure of a laser speed gun according to one embodiment of the invention. The system structure includes one Long Distance Lens (100), which in one embodiment of the invention is adapted for images in distances of 50 m to 400 m, one Short Distance Lens (200), which in one embodiment of the invention is adapted for images in distances of 15 m to 60 m, one Laser Class I Transmitter Diode (300), one Laser Receiver (400), two Semi-Transparent Mirrors (Beam Splitter) (500) and two CCD Cameras (600 and 700, respectively). The abovementioned elements of the laser gun are well known per se in the art and, therefore, are not described herein in detail, for the sake of brevity.

Figure 4:
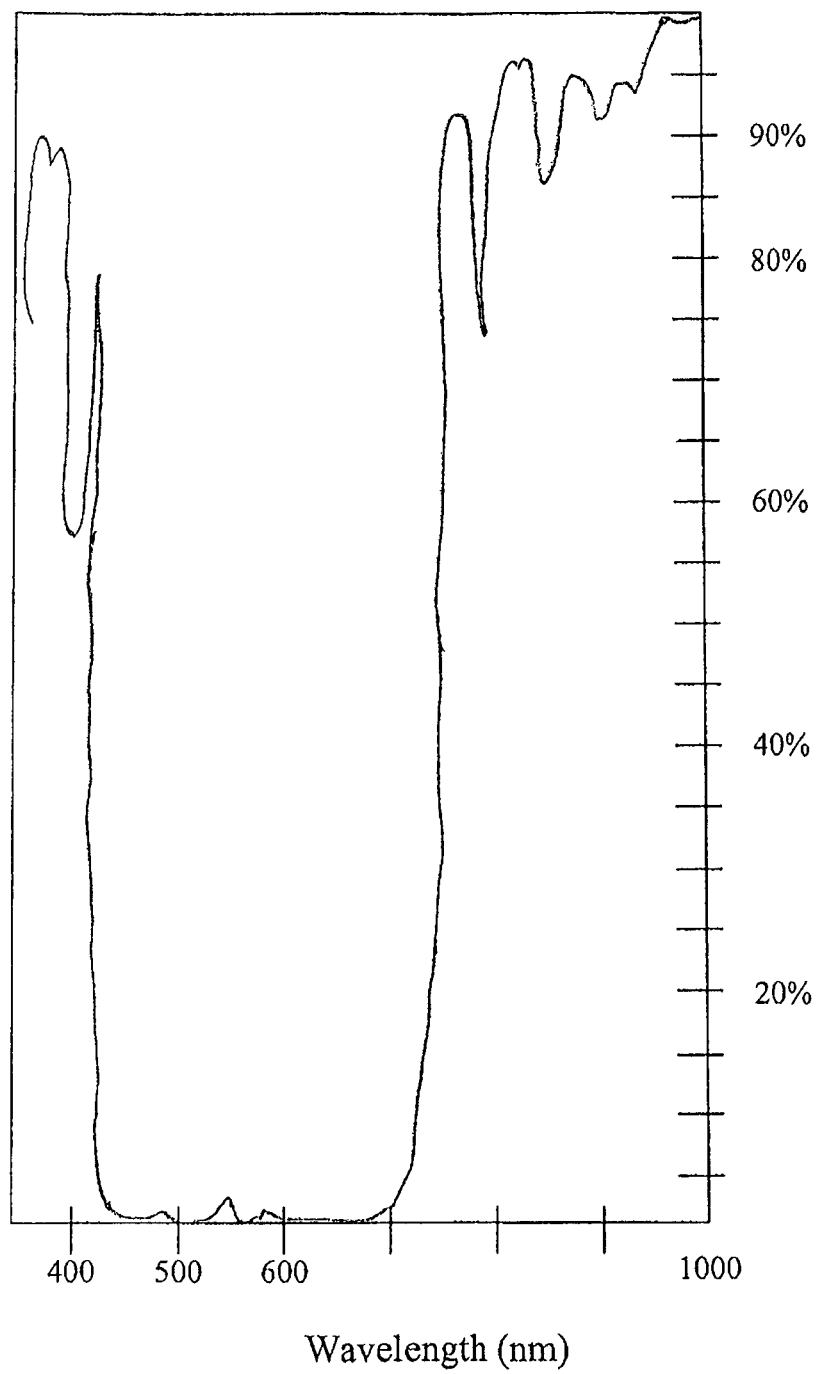
FIG. 4 is the characteristic absorption-transmission graph of a beam splitter suitable for use with the optical structure of FIG. 3.
Figure 5A:
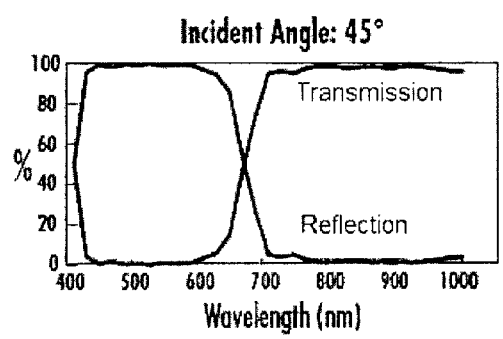
FIG. 5 (A though D) shows the characteristics of one Semi transparent Beam Splitter suitable for use in the invention, which are manufactured by Edmund Optics P/N NT62-636.
Figure 5C:
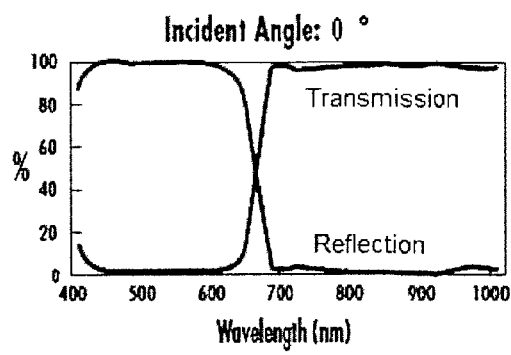
Figure 5B:
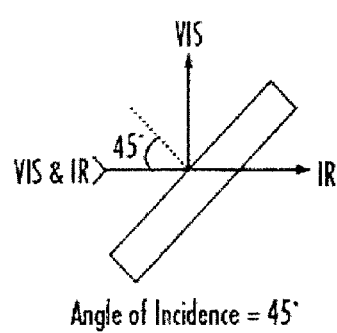
Figure 5D:
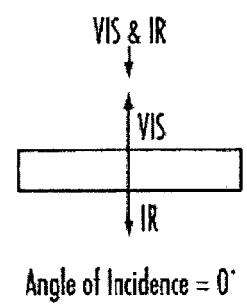

In the illustrative embodiment of the invention exemplified herein, Laser Transmitter Diode (300) sends laser pulses at a wavelength of λ=905 nm±10 nm. These beams pass through the Semi-Transparent Mirror (500) positioned with a 45° angle relative to the optical axis. The Semi-Transparent mirror coating and assembly of 45° enable it to pass wavelengths from 760 nm to 1000 nm (about 90% of the signal—schematically shown with dotted lines), and to reflect 95% of visible light (as a beam splitter) i.e. 420 nm-700 nm (schematically shown with solid lines). This is illustrated by the characteristic Beam Splitter graph shown in FIG. 4 and FIG. 5 (A through D), which relate to a Semi transparent mirror (Beam Splitter) manufactured by Edmund Optics P/N NT62-636, which is an example of a type suitable to be used with the invention. Characteristic data for the abovementioned NT62-636 Cold Mirror 45 degrees AOI 20 mm diameter beam splitter is detailed in Table I below.

TABLE I

| | |
|---|---|
| BDiameter (mm) | 20 |
| Dimensional Tolerance (mm) | 0.25 |
| Thickness (mm) | 1.10 |
| Angle of Incidence (°) | 45 |
| Substrate | BOROFLOAT ™ |
| Transmission (%) | >85-1200 nm |
| Reflection (%) | >90-650 nm |
| Operation Temperature (° C.) | +10 to +232 |
| RoHS | Compliant |

The laser beams originating from the laser transmitter are constantly sent to the Short Distance Lens (200) and from there to a specific car the speed of which the user wishes to measure. The Short Distance Lens (200) optics of this illustrative embodiment of the invention can acquire a good quality image of the speeding car at distances of 15 m to 60 m, due to a smaller lens focus than the Long Distance Lens (100). An illustrative and non-limitative Long Distance lens focus is 126 mm, and an illustrative and non-limitative Short Distance lens focal distance is 50 mm. These dimensions are provided to illustrate one embodiment of the invention and are not intended to limit it in any way.

Part of the laser beams that hit the car (symbolized by visible Target 800) are reflected back towards the laser gun camera and are collected by the Long Distance Lens (100). The Long Distance Lens (100) optics of this illustrative embodiment of the invention can acquire a good quality image of the speeding car at distances of 50 m to 400 m, due to a larger lens focus than the Short Distance Lens (200).

The reflected laser beams pass the Semi-Transparent Mirror (500) (due to their wavelength) and reach the Laser Receiver module (400). Since not all the laser beams that are sent are collected, the laser gun is provided with an amplifier, to intensify the returning signals, and is also provided with a high quality and high sensitivity receiver, to read them. Measuring the time differences between sent signals and received signals will determine the exact car speed.

In order to monitor which car is being checked for speed, a car image is continuously sampled in high frequency through the Short and Long Distance Lenses (200) and (100), respectively. The visible light signals that reach the Semi Transparent Mirrors (500) are reflected by the beam splitter to the CCD Cameras (600) and (700), respectively, due to their wavelength. The acquired image is then sent to a high quality LCD that enables the user to see in real time the image of the car the speed of which is being sampled.

Since the CCD Camera (600) is on the same optical axis 310 as the Laser Transmitter (300) and the CCD Camera (700) is on the same optical axis 410 as the Laser Receiver (400), and their focal planes are conjugated with the corresponding focal planes of the transmitter and of the receiver, and due to the fact that all optical system is provided as one assembly (e.g., as one metal casting housing), the image shown will always be the image of the car the speed of which is being tested. The user changes the lens with which he is taking photos according to the distance of the cars he wishes to measure. This enables an accurate and reliable measurement of the actual speeding car. Suitable software provided within the device (which is conventional and well understood to the skilled person and, therefore, is not described herein in detail for the sake of brevity) determines which CCD Camera to use (the one of the Long Distance Lens (100) or the one of the Short Distance Lens (200). This dual use of camera lenses (to send/receive laser signals and image signals on the same device) is unique and accompanied with a high accuracy of measurement along with no calibration problems and inaccuracies. As explained above, the decision with which lens to acquire the image is made by the user in the field in real time.

The optical axes of transmitter module and of the receiver module are parallel to each other (FIG. 3), and therefore the transmitter and receiver focal planes are conjugated. The focal planes of both CCD cameras are conjugated with the corresponding focal planes of the Laser transmitter and receiver. This means, that the images from both CCD cameras are also mutually conjugated and both are conjugated to the receiver as well. In other words, the image that the user sees on both CCD cameras and the measurement results on the receiver are mutually conjugated.

All the above description of preferred embodiments has been provided for the purpose of illustration and is not intended to limit the invention in any way. As will be apparent to the skilled person, many variations can be provided in the various elements of invention; for instance, different beam splitters and CCD cameras can be employed, various lens arrangements can be used, and different types of housings can be devised, all without exceeding the scope of the invention.

The invention claimed is:

1. A laser speed gun comprising:
 a) a laser ray transmitter provided on an optical axis with a short distance lens and, located at an intermediate location between said laser ray transmitter and said short distance lens on said optical axis, a beam splitter suitable to allow laser rays to pass through said beam splitter and to reflect visible light toward a first CCD camera;
 b) a laser ray receiver provided on an optical axis with a laser ray receiving device and with a long distance lens and, located at an intermediate location between said laser ray receiving device and said long distance lens on said optical axis, a beam splitter suitable to allow laser rays to pass through said beam splitter and to reflect visible light from a target toward a second CCD camera;
 c) the first and second CCD cameras, the first CCD camera which is associated with laser ray transmitter optics which is the Short distance lens and receives reflected light from said beam splitter of said laser ray transmitter optics, and the second CCD camera which is associated with laser ray receiver optics, which is the Long distance lens, and receives reflected light from a target from said beam splitter of said laser ray receiver optics.

2. A laser speed gun according to claim 1, wherein all elements are assembled in a single housing.

3. A laser speed gun according to claim 1, comprising one Long Distance Lens for taking images located at distances of 50 m to 400 , and one Short Distance Lens for taking images located at distances of 15 m to 60 m.

4. A laser speed gun according to claim 1, comprising one Laser Class I Transmitter Diode, one Laser Receiver, two Semi-Transparent Mirrors functioning as Beam Splitter, and the first and second CCD Cameras.

5. A laser speed gun according to claim 3, wherein the focus of the Long Distance lens is 126 mm, and that of the Short Distance lens focus is 50 mm.

\* \* \* \* \*

UNITED STATES PATENT AND TRADEMARK OFFICE
CERTIFICATE OF CORRECTION

| | |
|---|---|
| PATENT NO. | : 8,941,819 B2 |
| APPLICATION NO. | : 13/697336 |
| DATED | : January 27, 2015 |
| INVENTOR(S) | : Anisimov |

It is certified that error appears in the above-identified patent and that said Letters Patent is hereby corrected as shown below:

In the Claims,

Column 4,
Line 64, "50 m to 400" should read --50m to 400m--.

Signed and Sealed this
Eighth Day of September, 2015

Michelle K. Lee
*Director of the United States Patent and Trademark Office*